United States Patent [19]

Vogel

[11] 4,296,967
[45] Oct. 27, 1981

[54] PASSENGER SEAT

[76] Inventor: Ignaz Vogel, Kleinsteinbacherstr. 44, Karlsruhe-Stu 41, Fed. Rep. of Germany, 7500

[21] Appl. No.: 90,245

[22] Filed: Nov. 1, 1979

[51] Int. Cl.³ .......................... A47C 3/12; A47C 5/12
[52] U.S. Cl. .................................... 297/451; 297/452; 297/454
[58] Field of Search ............... 297/443, 452, 445, 454, 297/450, 451, 373; 206/814

[56] References Cited

U.S. PATENT DOCUMENTS

| | | | |
|---|---|---|---|
| 2,815,067 | 12/1957 | Richardson | 297/443 |
| 3,091,497 | 5/1963 | Houser | 297/452 X |
| 3,306,513 | 2/1967 | Fishman | 206/814 X |
| 3,797,887 | 3/1974 | Barecki et al. | 297/454 |
| 3,948,557 | 4/1976 | Barecki | 297/452 |
| 4,123,105 | 10/1978 | Frey et al. | 297/451 |

FOREIGN PATENT DOCUMENTS 477631  1/1938  United Kingdom ................ 297/373

*Primary Examiner*—James T. McCall
*Attorney, Agent, or Firm*—Klaus J. Bach

[57] ABSTRACT

A passenger seat for vehicles such as buses, railway cars, ships and airplanes which has a seating member mounted on a base and a backrest member mounted by a support structure on the seating member. The seating and backrest members consist of sandwiched plates which have the support structure for the backrest member incorporated therein.

11 Claims, 4 Drawing Figures

PASSENGER SEAT

BACKGROUND OF THE INVENTION

1. Field of the Invention

The present invention relates to a passenger seat for vehicles such as buses, railway cars, ships and airplanes.

2. Description of the Prior Art

Two types of passenger seats are generally employed for passenger vehicles, economy and luxury seats. The economy seats which are usually installed in vehicles which are used by passengers only for relatively short rides, are, in accordance with their intended use, of relatively simple construction and have little but extremely well-wearing upholstery, generally with plastic cover materials. Particularly, neither the seating portion nor the backrest are tiltable but both are firmly mounted on a seat base. In contrast, luxury seats have relatively thick upholstery, have a substantially more sensitive woven, plush cover material such as velour, and they are usually adjustable for various seating positions as desired. Adjustment may be possible with regard to the angle between the seating portion and backrest as well as between the seating portion and the floor of the vehicle.

All passenger seats however have to be capable of carrying not only the passenger load but also of withstanding the acceleration and deceleration forces including those induced by the passenger load. The passenger seats have to be strong enough to firmly support or retain the passenger, for example during an accident, but they also have to be rigid enough that unused seats do not rattle, that is, all connections as well as all joints have to be fully rattle-free.

In order to meet all these requirements, vehicle passenger seats have, so far, included tubular support structures of great rigidity. They have generally included a base constructed of round or even rectangular tubes supporting a seating frame to which a support structure for the backrest was mounted which, too, included a tubular support frame. For the mounting of the upholstery, a plate-type carrier usually consisting of plywood was mounted into each the seating and the backrest frame.

Vehicle seats of such a design usually meet all the requirements listed as they can be made in this manner to be very sturdy and they do not pose any design problems. Their disadvantage is, however, that they are relatively heavy so that a vehicle provided with such seats always has to carry a substantial dead weight. In addition, of course, seats of the type described are expensive to manufacture because the tubular frames have to be bent and interconnected by special connecting elements.

It is accordingly desirable to provide a seat which is simple and relatively inexpensive to manufacture and which meets all requirements with respect to rigidity but, nevertheless, is relatively light.

SUMMARY OF THE INVENTION

Disclosed is a passenger seat for people-moving vehicles such as buses, railway cars, ships and airplanes wherein a seating member is supported on a seat base to which a backrest is connected, and both, the seating member as well as the backrest member include sandwiched support plates which have the seat-and-backrest support structures integrated therein.

Incorporation of the backrest support structures into the sandwich-type seating and backrest portion results in a seating and backrest arrangement of great rigidity, great strength and little weight. The use of such sandwich plates however not only simplifies the seat design but also results in substantially reduced labor expenditures. A further reduction in expenditures is possible by the use of formed seating and backrest members. This even obviates the need for upholstery or, at least, requires only very simple upholstery. Mounting of the sandwich plates by means of the support structures which are integrated into the sandwich plates results in a rigid and solid connection between all parts from the seat base to the backrest.

The sandwich plates may consist of various materials with regard to their core as well as to their cover sheets. It is advantageous to use sandwich plates and formed sandwich members with cover sheets reinforced by a cardboard-type honeycomb structure arranged therebetween since such structures are already in wide use. A sandwich plate structure presently coming into more widespread use has a formed plastic core with relatively large foam cells. It appears that such sandwich plates would be especially suitable for use in connection with the present invention and seats and backrests of such design would be even less expensive to manufacture. The cover sheets consist of aluminum or high strength plastic materials. Both materials have the advantage that they are nailable so that the same tools can be used as have so far been used in the production of similar passenger seats with wooden seating and backrest support members.

A simple but very rigid connection between the seating and backrest members as well as the seat base is achieved when the integrated support structures consist of sleeves, at least one in each of the seating and backrest members, which firmly receive a support bracket for the backrest member. Preferably, the sleeves are of out-of-round, particularly of rectangular cross-section and connected to the cover sheets of the sandwich plates by joining means known in the art; preferably they are cemented together with the cover sheets of the sandwich members.

If the support structure, that is the bracket interconnecting the seating and backrest members is slightly elastic the amount of upholstery used for the backrest, can be reduced and an increased seating comfort is achieved. It is, of course, also possible to provide a lockable pivot in the support structure interconnecting the seating and backrest members so that the angle between the seating and backrest members is adjustable. For the mounting of the seating and backrest members on the base the seating member has at its underside a mounting structure which is connected to the integrated support structure and which engages the base member. This results in a rigid connection between the seat base and the mounting structures of the seating and the backrest members and provides for the desired rigidity of the passenger seat.

BRIEF DESCRIPTION OF THE DRAWINGS

What are at present considered to be the preferred embodiments of the invention to which however the present invention must not be limited, will now be described with reference to the accompanying drawings wherein.

DESCRIPTION OF THE PREFERRED EMBODIMENTS

Figure 1:
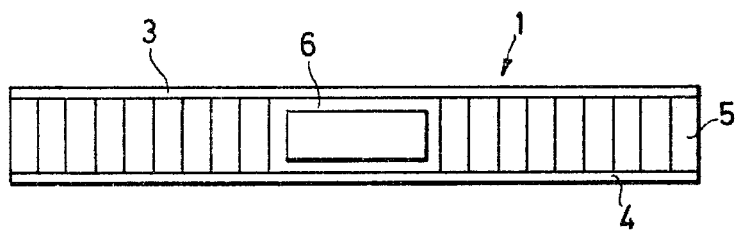
FIG. 1 is a rear view of a seating plate member.
Figure 2:
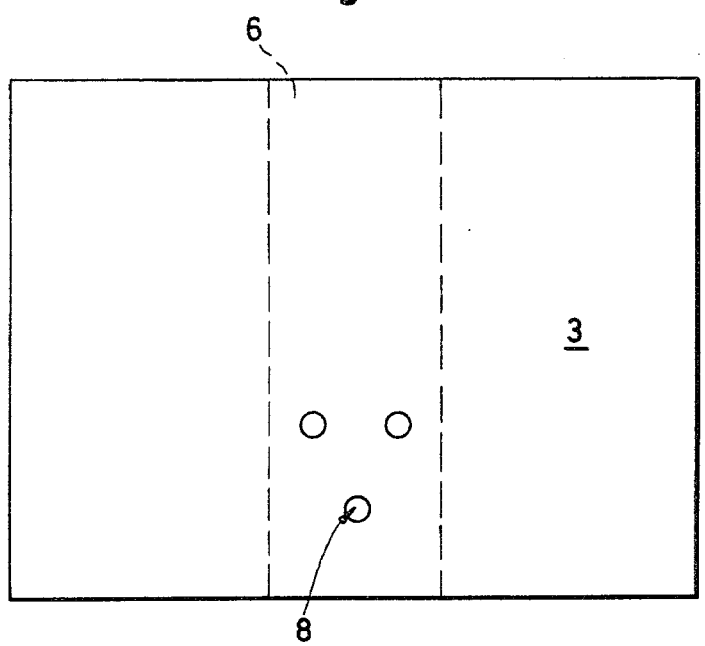
FIG. 2 is a plan view of the seating plate member.
Figure 3:
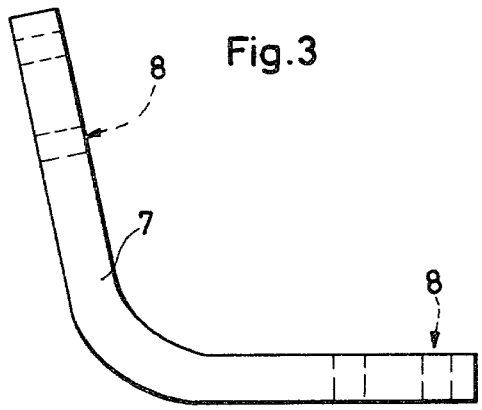
FIG. 3 shows a connecting bracket.

A sandwich plate 1 of a seating member 2 consists of the two cover sheets 3, 4 which as shown in FIGS. 1, 2 have disposed therebetween a honeycomb core 5 consisting of cardboard or paper for example which is cemented to the cover sheets for reinforcement of the plate. Formed into the sandwich plate 1 is a sleeve 6 of rectangular cross-section, which sleeve is firmly connected to the cover sheets 3, 4 for example by cementing. The sleeve 6 is adapted to snugly receive the end of a connecting bracket 7 (FIG. 3). Both the connecting bracket 7 and the sleeve 6 as well as the cover sheets 3 and 4 have corresponding bores 8 into which bolts may be inserted for firmly bolting the connecting bracket 7 to the sandwich plate 1.

Figure 4:
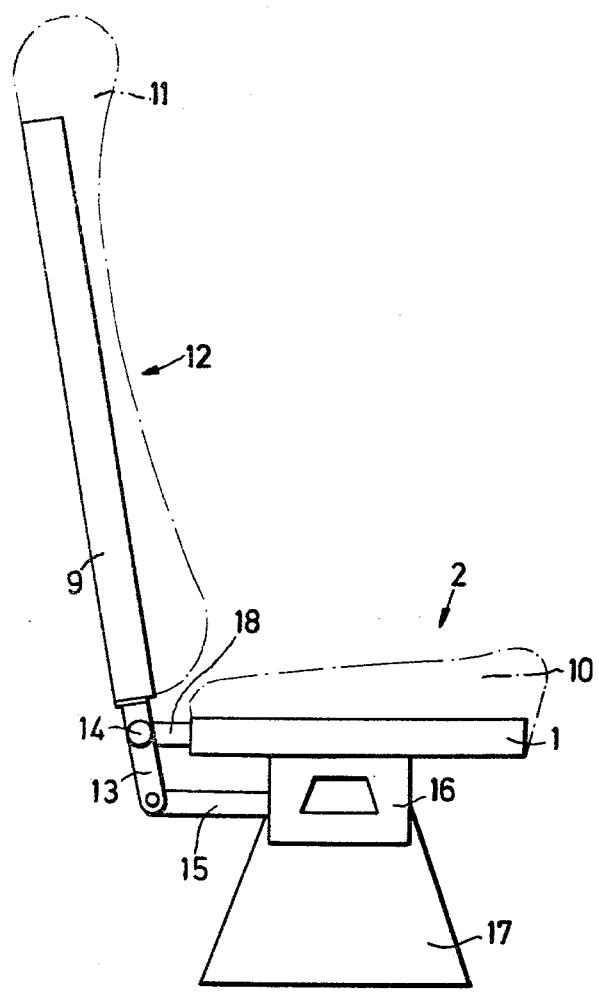
FIG. 4 is a side view of an assembled passenger seat.

FIG. 4 shows a passenger seat assembled from sandwich plates 1 and 9, the seat, in this embodiment, having an adjustable backrest 12. In dash-dotted lines, FIG. 4 shows an upholstery 10, 11 mounted on the seating sandwich plate 1 and a backrest sandwich plate 9. As shown in FIG. 4, the backrest sandwich plate 9 is mounted on a swivel arm 13 pivotally supported in swivel bearing structure 14 and has an adjusting element 15 connected thereto at its free end such as a pressurized gas spring with locking means. The sandwich plate 1 of the seating member 2 has at its bottom a mounting support 16 which is mounted on a seat base 17. The mounting support 16 is connected to the sleeve 6 within the sandwich plate 1 or rather to a bracket member 18 fitted into the sleeve 6 so that there is a rigid connection between the base 17 of the seat and the sleeve 6 or rather the sandwich plate 1 through the mounting support 16. It is not necessary for the sleeves 6 to extend over the full depths of the sandwich plates 1 or respectively 9. They need to be only long enough to transfer support and adjustment forces smoothly into the sandwich plates 1 and 9.

The use of sandwich plates which have support means incorporated therein not only simplifies manufacture and reduces the cost of passenger seats, but the passenger seats, as a result, have a substantially reduced weight which greatly reduces the dead weight of a vehicle provided with such seats.

I claim:

1. A passenger seat for people moving vehicles such as buses, railways cars, ships and airplanes, said seat comprising: a base; a seating member supported on said base; a backrest member mounted on said seating member, said seating and backrest members consisting of sandwiched plate structures each having spaced plates with a cellular structured core disposed therebetween and a sleeve fully incorporated into the sandwiched plate structure by being disposed between and firmly connected to each of said spaced plates, a bracket structure having its ends extending into the sleeves of said seating and backrest members and being mounted therein for supporting said backrest member on said seating member, and mounting means disposed at the underside of said seating member and connected to said sleeve incorporated in said seating member for supporting said seating and backrest members on said base.

2. A passenger seat as recited in claim 1, wherein said sandwich plates are shaped members.

3. A passenger seat as recited in claim 1, wherein said sandwich plates have honeycomb structured cardboard cores.

4. A passenger seat as recited in claim 1, wherein said sandwich plates have cores of coarse cellular foamed plastic having a cover sheet at each side so as to form rigid support plates.

5. A passenger seat as recited in claim 3 or 4, wherein said cover sheets consist of aluminum.

6. A passenger seat as recited in claim 3 or 4, wherein said cover sheets consist of high-strength plastic materials.

7. A passenger seat as recited in claim 1, wherein said sleeves are rectangular in cross-section.

8. A passenger seat as recited in claim 7, wherein said sleeves are cemented into the sandwich plates.

9. A passenger seat as recited in claim 1, wherein said bracket structure is somewhat elastic.

10. A passenger seat as recited in claim 1, wherein said bracket structure includes a lockable pivot bearing.

11. A passenger seat for people moving vehicles such as buses, railways cars, ships and airplanes, said seat comprising: a base; a seating member supported on said base; a backrest member mounted on said seating member, said seating and backrest members consisting of sandwiched plate structures each having a honeycomb structured core with cover sheets at both sides connected to said honeycomb structured core so as to form a rigid support plate; a central sleeve fully incorporated in said support plate between said cover sheets and connected thereto; a bracket structure having its ends extending into the sleeves of said seating and backrest members and being mounted therein for supporting said backrest member on said seating member, and means for mounting the sleeve incorporated in said seating member for supporting said seating and backrest members on said base.

* * * * *